United States Patent
Jeong et al.

(10) Patent No.: US 7,948,940 B2
(45) Date of Patent: May 24, 2011

(54) METHOD AND APPARATUS FOR SELECTING FREQUENCY LAYER FOR CONNECTED MODE UE IN AN MBMS MOBILE COMMUNICATION SYSTEM

(75) Inventors: Kyeong-In Jeong, Suwon-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 11/189,007

(22) Filed: Jul. 26, 2005

(65) Prior Publication Data

US 2006/0023664 A1 Feb. 2, 2006

(30) Foreign Application Priority Data

Jul. 27, 2004 (KR) .............................. 10-2004-58947
Oct. 21, 2004 (KR) .............................. 10-2004-84329

(51) Int. Cl.
*H04Q 7/00* (2006.01)

(52) U.S. Cl. ........ 370/329; 370/443; 370/337; 370/390; 370/432; 370/465; 455/435.1; 455/434; 455/414.4; 455/433; 455/453

(58) Field of Classification Search .............. 455/414.1, 455/437, 435.1, 436, 434, 414.4, 433, 450, 455/464, 515; 370/329, 343, 332, 390, 342, 370/455, 432

See application file for complete search history.

(56) References Cited

U.S. PATENT DOCUMENTS

| 6,032,046 A | 2/2000 | Nakano et al. |
| 6,111,864 A * | 8/2000 | Kabasawa .................... 370/332 |
| 6,546,251 B1 | 4/2003 | Dalsgaard et al. |
| 7,130,285 B2 | 10/2006 | Chang |
| 7,277,706 B2 * | 10/2007 | Hurtta et al. ................ 455/435.1 |
| 7,336,659 B2 * | 2/2008 | Meago ........................... 370/390 |
| 2003/0174678 A1 * | 9/2003 | Chang et al. .................. 370/335 |

(Continued)

FOREIGN PATENT DOCUMENTS

EP 1509056 2/2005

(Continued)

OTHER PUBLICATIONS

"Universal Mobile Telecommunications System (UMTS); Introduction of Multimedia Broadcast/Multicast Service (MBMS) in the Radio Access Network (RAN) Stage 2 (3GPP TS 25.346 version 6.1.0 Release 6); ETSE TS 125 346" ETSI Standards, European Telecommunications Standards Institute, Sophia-Antipo, FR, vol. 3-R, No. V610, Jun. 2004 XP014016838.

(Continued)

*Primary Examiner* — Nick Corsaro
*Assistant Examiner* — Michael T Vu
(74) *Attorney, Agent, or Firm* — Roylance, Abrams, Berdo & Goodman, LLP

(57) ABSTRACT

A method and apparatus for selecting the PL of an interested MBMS service for a UE in an MBMS mobile communication system are provided. A connected mode UE receives FLC applicability information for an interested MBMS service and keeps a current frequency or reselects to the PL of the MBMS service according to the FLC applicability information. Even if the FLC applicability information restricts FLC from the connected mode UE, the connected mode UE can reselect to the PL of the MBMS service according to its priority level.

21 Claims, 6 Drawing Sheets

U.S. PATENT DOCUMENTS

| | | |
|---|---|---|
| 2003/0211848 A1 | 11/2003 | Rajkotia et al. |
| 2004/0116139 A1 | 6/2004 | Yi et al. |
| 2004/0224698 A1* | 11/2004 | Yi et al. ............ 455/450 |
| 2005/0245260 A1* | 11/2005 | Nielsen et al. ........ 455/435.1 |
| 2006/0126590 A1* | 6/2006 | Putcha et al. ............ 370/343 |

FOREIGN PATENT DOCUMENTS

| | | |
|---|---|---|
| JP | 2005-252506 | 9/2005 |
| JP | 2006-121641 | 5/2006 |
| KR | 1020010086382 | 9/2001 |
| KR | 1020010098538 | 11/2001 |
| KR | 1020030087982 | 11/2003 |
| RU | 2233047 C2 | 7/2004 |
| WO | WO00/72609 A1 | 11/2000 |

OTHER PUBLICATIONS

Issues on Frequency layer Convergence, 3GPP TSG RAN WG2 #42, May 10, 2004, pp. 1-3, R2-040928.

* cited by examiner

METHOD AND APPARATUS FOR SELECTING FREQUENCY LAYER FOR CONNECTED MODE UE IN AN MBMS MOBILE COMMUNICATION SYSTEM

CROSS-REFERENCE TO RELATED APPLICATIONS

This application claims the benefit under 35 U.S.C. §119 (a) of an application entitled "Method and Apparatus for Selecting Frequency Layer for Connected Mode UE in an MBMS Mobile Communication System" filed in the Korean Intellectual Property Office on Jul. 27, 2004 and assigned Serial No. 2004-58947, and an application entitled "Method and Apparatus for Selecting Frequency Layer for Connected Mode UE in an MBMS Mobile Communication System" filed in the Korean Intellectual Property Office on Oct. 21, 2004 and assigned Serial No. 2004-84329, the entire contents of each are hereby incorporated by reference.

BACKGROUND OF THE INVENTION

1. Field of the Invention

The present invention relates generally to Multimedia Broadcast/Multicast Service (MBMS). In particular, the present invention relates to a method for controlling the selection of a frequency layer on which a connected mode User Equipment (UE) is to receive an MBMS service.

2. Description of the Related Art

The development of communication technology has lead to a Wideband Code Division Multiple Access (WCDMA) scheme that provides multimedia broadcasting/telecommunications services involving the transmission of a large volume of packet data or multimedia data, beyond the traditional voice service. In this context, the use of MBMS which services multiple UEs from one or more multimedia data sources is under discussion to support the multimedia broadcasting/telecommunications.

The MBMS is a service designed to transmit the same multimedia data to a plurality of recipients over a wireless network. As the recipients share one radio channel, radio resources can be conserved. The MBMS supports Frequency Layer Convergence (FLC) with the aim of more efficient use of radio resources. The FLC is the process of transmitting an MBMS service at only one specified frequency rather than providing the MBMS service at all overlapped frequencies available within the same area, and requesting UEs that want to receive the MBMS service to preferentially re-select the specified frequency. This specified frequency is called the preferred frequency or preferred frequency layer (PL) of the MBMS service. The UEs perform an MBMS frequency selection procedure according to the FLC.

When an MBMS session starts for an MBMS service, the PL for the MBMS service is decided by Radio Resource Management (RRM). Because an idle mode UE does not have associated traffic, even though it has joined the MBMS service from a different frequency layer and reselects to the PL, this does not affect the state of the system resources. In contrast, a connected mode UE receiving a dedicated traffic service has associated traffic and thus it may not receive the dedicated service on the PL depending on the radio resource availability of the PL. If the radio resources of the PL are not sufficient to accommodate the traffic of the connected mode UE, the dedicated service is not available any longer.

SUMMARY OF THE INVENTION

An object of the present invention is to substantially solve at least the above problems and/or disadvantages and to provide at least the advantages below. Accordingly, an object of the present invention is to provide a method and apparatus for deciding as to whether to apply or restrict the FLC to or from a connected mode UE that has subscribed to an MBMS service.

Another object of the present invention is to provide a method and apparatus for deciding in a network as to whether to apply or restrict the FLC to or from a connected mode UE that has subscribed to an MBMS service, taking into account the radio resource state of the PL of the MBMS service.

A further object of the present invention is to provide a method and apparatus for transmitting to a connected mode UE information indicating whether the FLC is to be applied to the connected mode UE.

Still another object of the present invention is to provide an operation and configuration of a connected mode UE in relation to information indicating whether the FLC is to be applied to the connected mode UE.

The above objects are achieved by providing a method and apparatus for selecting frequency layer for connected mode UE in an MBMS mobile communication system.

According to one aspect of the present invention, in a method for selecting a frequency layer in a connected mode UE on a non-preferred frequency layer (NPL) in an MBMS communication system, the connected mode UE receives from a radio network controller (RNC) a message including preferred frequency information associated with a PL of an MBMS service, determines whether the preferred frequency information includes PL service restriction information, switches to the PL, if the preferred frequency information does not include the PL service restriction information. Otherwise, the connected mode UE keeps a current frequency if the preferred frequency information includes the PL service restriction information.

According to another aspect of the present invention, in a method for selecting a frequency layer in a connected mode UE on a NPL in an MBMS communication system, the connected-mode UE receives from an RNC a message including preferred frequency information associated with a PL of an MBMS service, and determines whether the preferred frequency information includes PL service restriction information. If the preferred frequency information does not include the PL service restriction information, the connected mode UE switches to the PL. If the preferred frequency information includes the PL service restriction information, the connected mode UE performs a priority-based service selection and determines whether the connected mode UE continues to use a current frequency according to the result of the priority-based service selection.

According to a further aspect of the present invention, in an apparatus in a UE for selecting a frequency layer in a connected mode in an MBMS communication system, a message receiver receives from an RNC a message including preferred frequency information associated with a PL of an MBMS service. A service controller determines whether the connected mode UE is on an NPL and whether the preferred frequency information includes PL service restriction information. A data receiver switches to the PL and receives the MBMS service if the connected mode UE is on the NPL and the preferred frequency information does not include the PL service restriction information, and keeps a current frequency if the connected mode UE is on the NPL and the preferred frequency information includes the PL service restriction information.

According to still another aspect of the present invention, in a method of controlling the frequency layer selection of connected mode UEs in an RNC in an MBMS mobile communication system, the RNC determines the preferred frequency information including any PL service restriction information, which restricts connected mode UEs in cells controlled by the RNC from reselecting to the PLs of MBMS services requested by the connected mode UEs, and transmits to the connected mode UEs a message including the preferred frequency information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will be described herein below with reference to the accompanying drawings. In the following, descriptions of well-known functions or constructions are omitted for the sake of clarity and conciseness.

Figure 1:
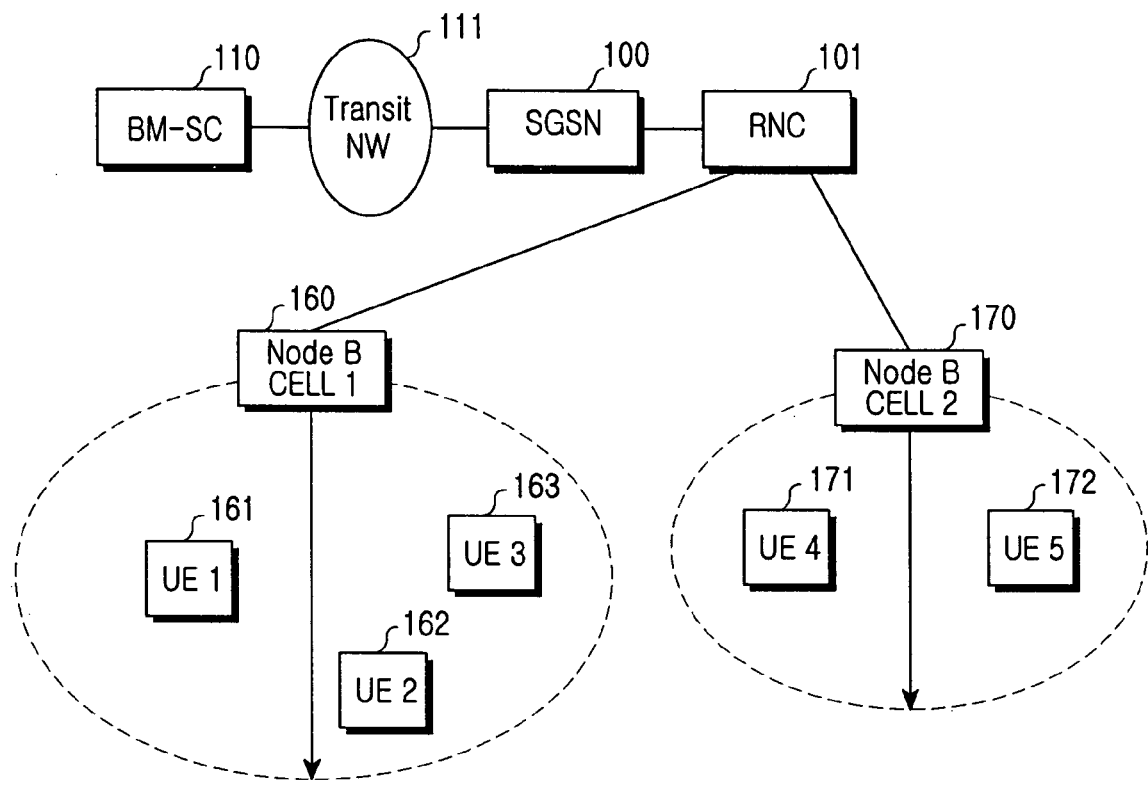
FIG. 1 illustrates the configuration of an MBMS mobile communication system.

FIG. 1 illustrates the configuration of an MBMS mobile communication system. Particularly, a Universal Mobile Telecommunications System (UMTS) Terrestrial Radio Access Network (UTRAN) is shown which implements MBMS in an asynchronous 3rd generation communication standard, 3rd Generation Project Partnership (3GPP) system.

Referring to FIG. 1, UEs 161, 162, 163, 171 and 172 are MBMS-enabled terminal devices or MBMS subscribers. First and second cells 160 and 170 (Cell 1 and Cell 2) are geographical or logical areas that wirelessly transmit MBMS data to subscribers, controlled by base station devices, that is, Node Bs. A Radio Network Controller (RNC) 140 controls the cells 160 and 170, selectively transmits multimedia data to a specific cell, and controls the radio channels established for MBMS services. The connection between the RNC 140 and the UEs 161 to 172 is called a Radio Resource Control (RRC) interface.

The RNC 140 is connected to a Packet Switched or Packet Service (PS) network such as the Internet through a Serving GPRS Support Node (SGSN) 130. Communications are made between the RNC 140 and the PS network by PS signaling. In particular, the connection between the RNC 140 and the SGSN 130 is called an Iu-PS interface.

The SGSN 130 controls MBMS-associated services for individual subscribers. These services include management of service billing data for each subscriber and selective transmission of multimedia data to a specific RNC 140.

A transit network (NW) 120 provides a communication path between a Broadcast Multicast Service Center (BM-SC) 110 and the SGSN 130. The transit NW 120 can be connected to an external network through a Gateway GPRS Support Node (GGSN: not shown). The BM-SC 110 is an MBMS data source responsible for MBMS data scheduling. The MBMS data streams generated from the BM-SC 110 are transferred to the UEs 161 to 172 through the transit NW 120, the SGSN 130, the RNC 140, and the cells 160 and 170.

Figure 2:
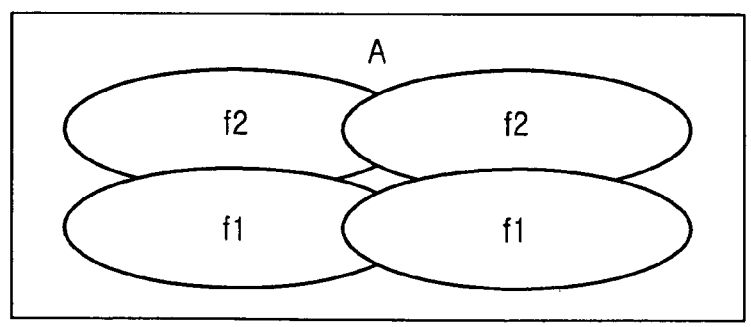
FIG. 2 illustrates an exemplary structure of cell layers overlapped in an MBMS service area.

With reference to FIG. 2, an exemplary configuration of an MBMS service area having overlapped cells will now be described. Referring to FIG. 2, areas covered by different frequencies, f1 and f2 are spatially overlapped within an MBMS service area A in which a specific MBMS service is provided. The overlapped frequency f1 or f2, or cells having f1 or f2 are called a frequency layer.

The FLC is the scheme where the UTRAN requests UEs that have subscribed to an MBMS service to preferentially re-select the frequency layer on which the MBMS service is to be transmitted in order to provide a given MBMS service per frequency layer f1 or f2 rather than on all frequency layers f1 and f2 in the area A. In the cell configuration illustrated in FIG. 2, if the PL for MBMS service B is f2, UEs on the frequency layer f1 in the area A switches to f2, that is, perform a cell reselection if they want to receive the MBMS service B, when an MBMS session starts for the MBMS service B and during the MBMS service B. The UTRAN instructs the UEs on f1 to move to f2 when the MBMS session starts and during the MBMS session. The f2 is the PL of MBMS service B and f1 is a non-preferred layer (NPL) of MBMS service B.

The MBMS service B is not always available on the NPL. In the case where the signal strength measurement of the PL is not sufficient for UEs on the NPL, MBMS service B can be provided to them on the NPL by RRM. Compared to the NPL, a specified MBMS service is provided mainly or only on the PL. While the PL is fixed to f2 for the MBMS service B in the above example, the PL for MBMS service B might be different in different areas. For example, the f2 is the PL for MBMS service B in some area, whereas f1 is the PL for MBMS service B in another area. The PLs for MBMS services depend on the cell architecture policy of the system operator and the radio resource state of the current cell. According to the 3GPP standards, the process of FLC defining the relationship between MBMS services and their PLs is applied from session start to session end for each MBMS service.

For an idle mode UE that has joined an MBMS service, there is no connection to the UTRAN and no data transmission. Therefore, it can move from the NPL to the PL irrespective of radio resource availability. On the other hand, the mobility of a connected mode UE from the NPL to the PL is affected by the radio resource availability, since it is placed in one of the Cell Forward Access Channel (CELL_FACH), the Cell Paging Channel (CELL_PCH), the UMTS Registration Area Paging Channel (URA_PCH), and the Cell Dedicated Channel (CELL_DCH) states.

No dedicated physical channel is allocated to the UE and the UE listens to a common transport channel in the CELL_FACH state. In the CELL_PCH state, the UE has neither a dedicated physical channel nor a dedicated logical channel. The URA_PCH state is similar to the CELL_PCH state. The URA_PCH state is set in the case that high mobility of the UE imposes constrains on cell update. Dedicated physical channels are available to the UE in the CELL_DCH state.

In the MBMS mobile communication system, the UTRAN can determine whether to apply or restrict the FLC to or from the connected mode UE according to the radio resource state of a corresponding PL. The UTRAN makes the determination by RRM and transmits the determination result to UEs within cells under control. The connected mode UE operates according to the determination result. The FLC scheme according to an embodiment of the present invention is effective particularly to UEs in the CELL_FACH or CELL_DCH state.

A detailed description will be made of the operation of an RNC for determining whether to apply or restrict the FLC to or from a UE with reference to FIG. 3.

Figure 3:
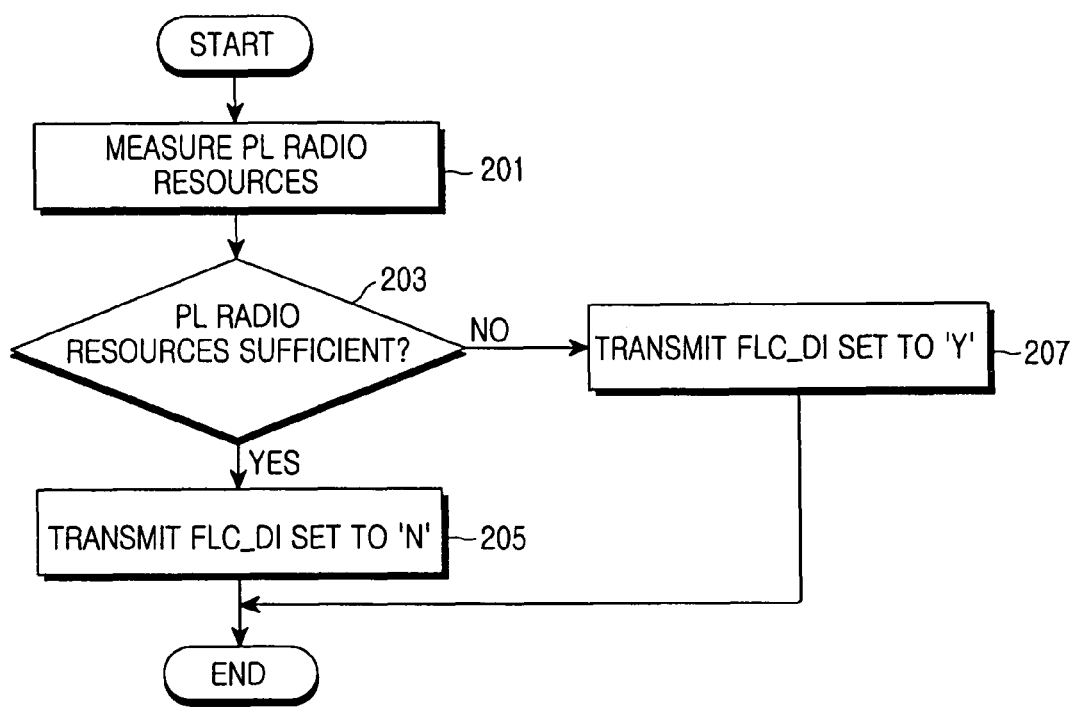
FIG. 3 is a flowchart illustrating an exemplary signal flow for an operation for determining whether to apply or restrict FLC to or from a connected mode UE according to an embodiment of the present invention.

FIG. 3 is a flowchart illustrating a signal flow for an operation for determining whether to apply or restrict FLC to or from connected mode UEs according to an embodiment of the present invention.

Referring to FIG. 3, the RNC measures the radio resources of the PL for an on-going MBMS service to determine whether to apply or restrict the FLC to or from connected mode UEs on an NPL in step 201.

In step 203, the RNC determines whether the measured radio resources are sufficient to accommodate associated traffic of the connected mode UEs. The determination may be made by taking into account the availability of the PL radio resources, the total number of connected mode UEs on the NPL which have joined the MBMS service, or the number of connected mode UEs in each state of CELL_FACH, CELL_PCH, URA_PCH, and CELL_DCH. If the radio resources are sufficient to accommodate the associated traffic, the RNC decides to apply the FLC to the connected mode UEs on the NPL and proceeds to step 205.

In step 205, the RNC sets FLC applicability information, FLC_DI (FLC Disabled Indication for connected mode UE) to 'N' and transmits it to the connected mode UEs associated with the MBMS service. Here, 'N' denotes the FLC application. In this case, the UTRAN can provide non-MBMS services on the MBMS PL.

Alternatively, if the radio resources are not sufficient to accommodate the associated traffic, the RNC decides not to apply the FLC to the connected mode UEs and goes to step 207. In step 207, the RNC sets FLC_DI to 'Y' and transmits it to the connected mode UEs. The 'Y' means FLC restriction. In this case, the provisioning of dedicated traffic services except the MBMS service is restricted on the PL. In other words, the UTRAN does not provide any non-MBMS service on the MBMS PL. Therefore, the FLC_DI value is set to 'Y' is called PL service restriction information.

The FLC_DI value can be a one-bit flag indicating the FLC application to or FLC restriction from the connected mode UEs or UEs in a specific RRC state (such as CELL_FACH). It can be further contemplated as another embodiment of the present invention that the FLC_DI value is a 4-bit bitmap or a 2-bit integer representing the FLC application or FLC restriction for up to four respective connected mode states in a network.

In the case of a 4-bit bitmap, the first to fourth bits sequentially represent the FLC application or FLC restriction for URA_PCH, CELL_CH, CELL_FACH, and CELL_DCH states. For example, a bitmap of '0011' can indicate that the FLC is restricted from UEs in the CELL_FACH and CELL_DCH states, but is applied to UEs in the URA_PCH and CELL_PCH states.

In the case of a 2-bit integer, for example, the 2-bit integers 00, 01, 10 and 11 can respectively represent a FLC restriction from UEs in the CELL_DCH, CELL_FACH, CELL_PCH and URA_PCH states. If, for example, the integer is '01', the FLC is restricted from UEs in the CELL_FACH, but is applied to UEs in the CELL_DCH, URA_PCH and CELL_PCH states.

Figure 4:
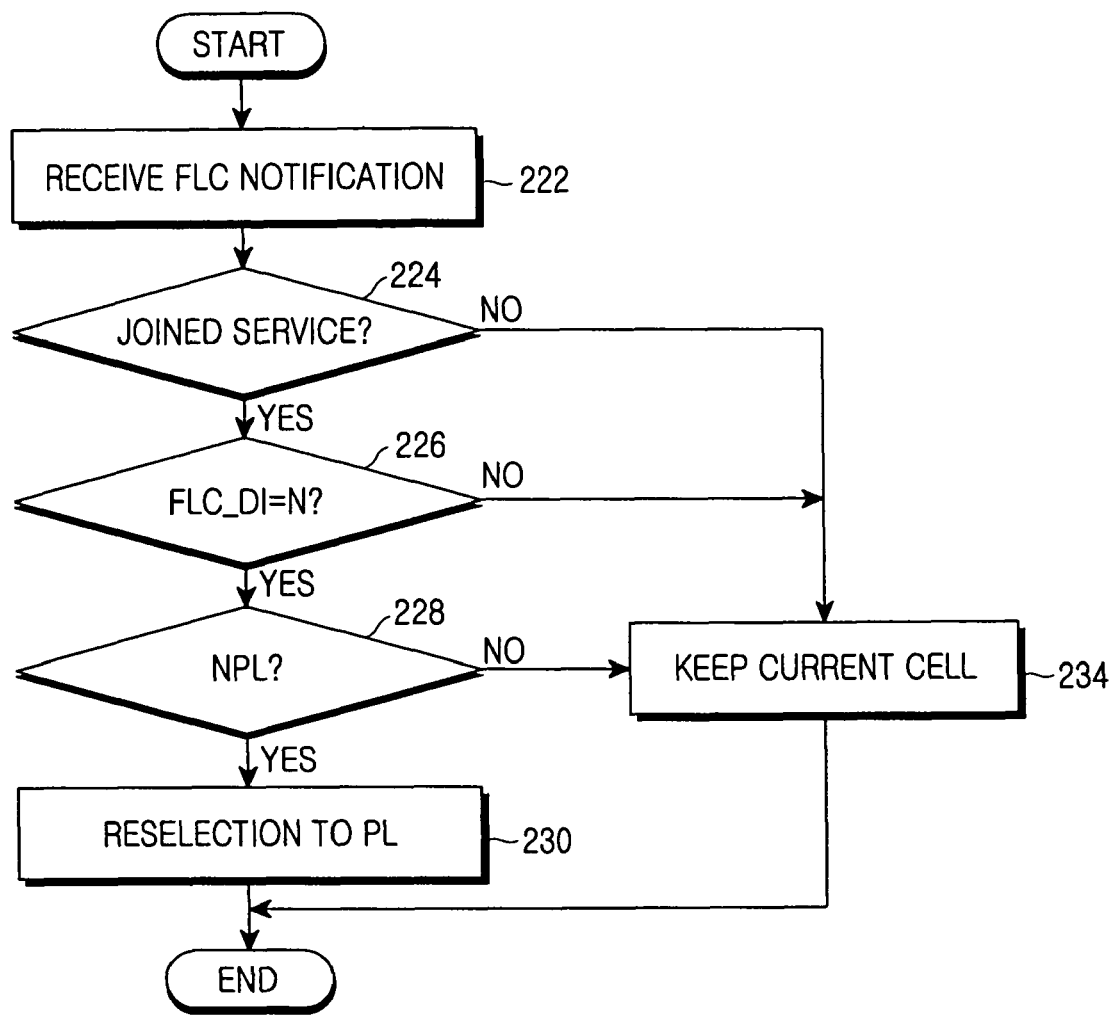
FIG. 4 is a flowchart illustrating the operation of a connected mode UE for receiving FLC applicability information according to an embodiment of the present invention.

FIG. 4 is a flowchart illustrating the operation of a connected mode UE for receiving FLC applicability information, the FLC_DI set as a one-bit flag according to an embodiment of the present invention.

Referring to FIG. 4, the UE receives an FLC Notification message including MBMS preferred frequency information by common signaling or dedicated signaling in step 222. The MBMS preferred frequency information preferably includes the service identifier (ID) of an MBMS service for which the FLC is to be performed, preferred frequency information indicating the PL of the MBMS service, an MBMS offset, and the FLC_DI setting.

In step 224, the UE determines whether the received service ID indicates an MBMS service that the UE has joined. If the service ID is not identical to that of the joined MBMS service, the UE keeps the current cell, that is, the current frequency without performing the FLC in step 234.

If the service ID indicates the joined MBMS service, the UE checks FLC_DI in step 226. If the FLC_DI setting is 'Y' indicating a FLC restriction from the UE, the UE goes to step 234 in which the UE stays at the current frequency without measuring the signal strength of the PL and reselecting to the PL. Even though the current frequency is an NPL, when the current frequency has sufficient available resources, the interested MBMS service can be provided on the NPL. Service availability on the NPL is known to the UE by MBMS control information received on the NPL.

If the FLC_DI setting is 'N' in step 226, the UE determines whether the current frequency is an NPL in step 228. If the UE is now on the NPL, it performs a cell reselection to the PL in step 230. On the contrary, if the UE is not on the NPL, it keeps the current frequency in step 234.

The cell reselection of step 230 is carried out based on the signal strength measurement of the PL indicated by the FLC Notification message received in step 222. The MBMS offset is used as a factor to increase the probability of cell reselection to the PL.

While a one-bit flag, the FLC_DI setting indicates the FLC application to or FLC restriction from a connected mode UE or a UE in a specific RRC state in the above embodiment, the one-bit flag can be replaced with a 4-bit bitmap or a 2-bit integer if FLC applicability is to be indicated for each connected mode state.

Figure 5:
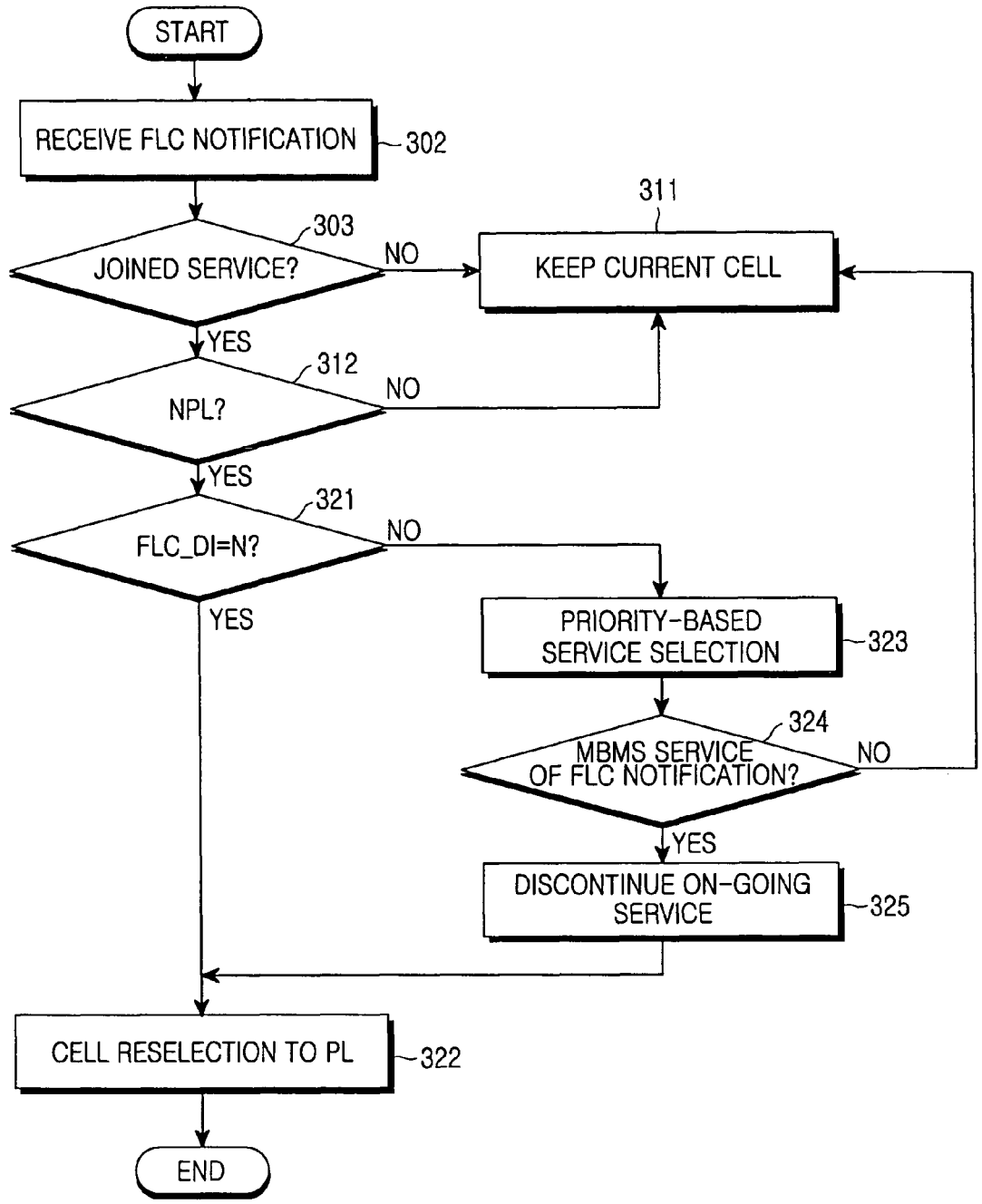
FIG. 5 is a flowchart illustrating the operation of a connected mode UE for receiving FLC applicability information according to another preferred embodiment of the present invention.

FIG. 5 is a flowchart illustrating the operation of a connected mode UE for receiving FLC applicability information as a one-bit flag according to another embodiment of the present invention. In the operation, the UE checks the FLC_DI setting only when it is on an NPL and, if the FLC_DI setting is 'Y', it performs a service selection procedure according to priority.

Referring to FIG. 5, the UE receives an FLC Notification message including MBMS preferred frequency information by common signaling or dedicated signaling in step 302. The MBMS preferred frequency information preferably includes the service ID of an MBMS service for which the FLC is to be performed, preferred frequency information indicating the PL of the MBMS service, an MBMS offset, and the FLC_DI. In step 303, the UE determines whether the received service ID indicates an MBMS service that the UE has joined. If the service ID is not identical to that of the joined MBMS service, the UE keeps the current cell, that is, the current frequency without performing the FLC in step 311.

If the service ID indicates the joined MBMS service, the UE determines whether the current frequency is an NPL in step 312. If the UE is not on the NPL, it keeps the current frequency in step 311. If the UE is now on the NPL, it goes to step 321.

In step 321, the UE checks FLC_DI. If the FLC_DI setting is 'Y', the UE selects one of an on-going dedicated traffic service and the MBMS service indicated by the FLC-notification in step 323. The UE selects a service with the higher priority level by interaction with a user or a Non-Access Stratum (NAS).

In step 324, the UE determines whether the selected service is the MBMS service indicated by the FLC Notification message, that is, the MBMS service having the PL. If the MBMS service has been selected, the UE discontinues the dedicated traffic service in step 325 and proceeds to step 322. In step 322, the UE measures the signal strength of the PL for the MBMS service and reselects to the PL based on the signal strength.

If the dedicated traffic service has been selected, the UE continues the dedicated traffic service at the current frequency without the FLC application in step 311.

While a one-bit flag, the FLC_DI setting indicates the FLC application to or FLC restriction from a connected mode UE or a UE in a specific RRC state in the above embodiment, the one-bit flag can be replaced with a 4-bit bitmap or a 2-bit integer if the FLC applicability is to be indicated for each connected mode state.

Figure 6:
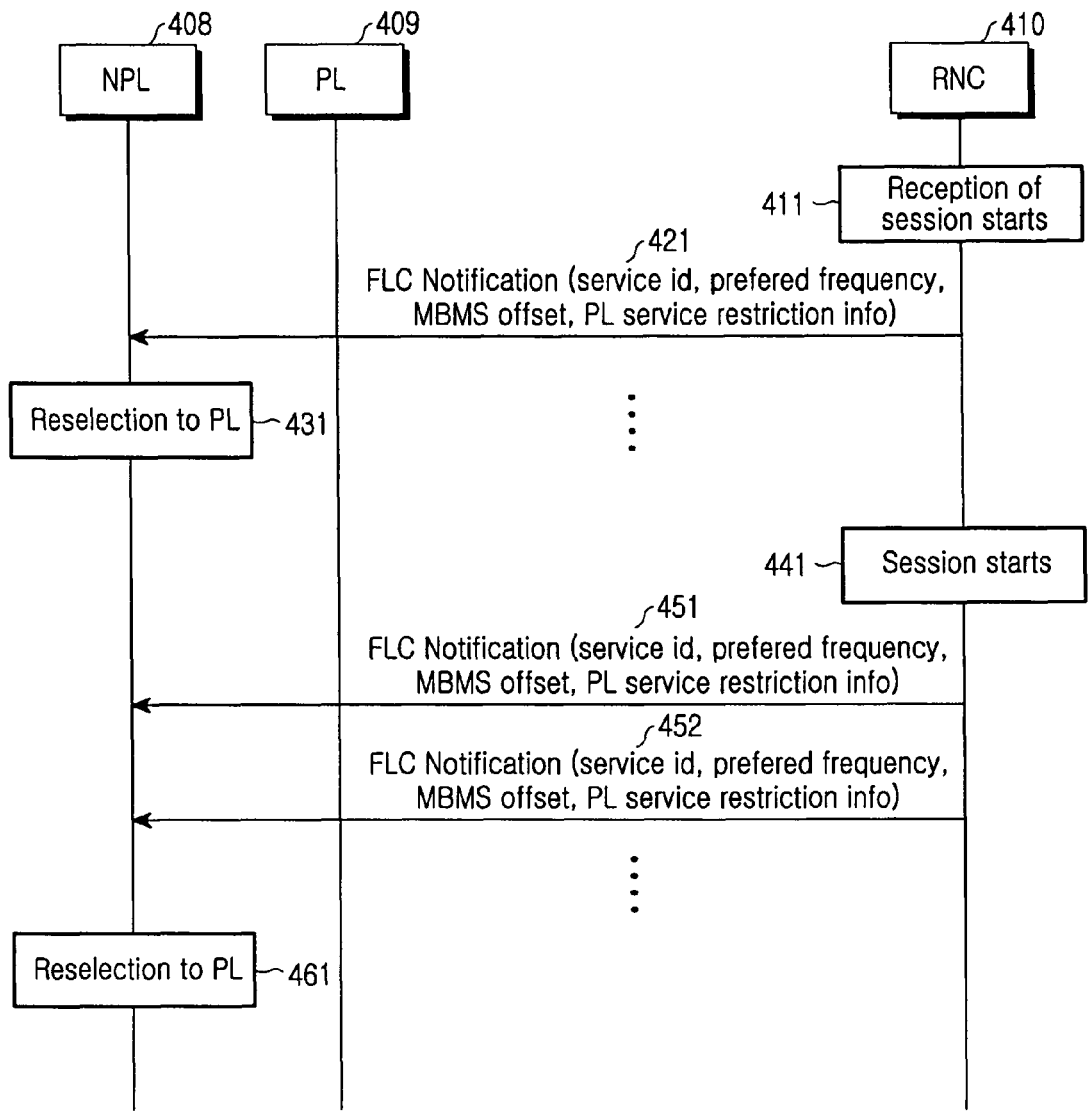
FIG. 6 is a flowchart illustrating a signal flow for transmitting and receiving MBMS preferred frequency information according to an embodiment of the present invention.

FIG. 6 is a diagram illustrating a signal flow for transmitting and receiving MBMS preferred frequency information according to an embodiment of the present invention. In FIG. 6, reference numeral 408 denotes an NPL for a specific MBMS service and reference numeral 409 denotes a PL for the MBMS service. The coverage areas of the NPL and PL overlap in an MBMS service area. Reference numeral 410 denotes an RNC for managing the radio resources of the NPL and PL for the MBMS service.

Referring to FIG. 6, the RNC 410 receives a Session Start message for one session of the MBMS service from an SGSN of a core network in step 411. The Session Start message requests the setup of a radio bearer for the MBMS session start. It contains a service ID and Quality of Service (QoS) information.

Upon receipt of the Session Start message, the RNC 410 transmits an FLC Notification message as signaling for the FLC in step 421. The FLC Notification message preferably includes the service ID of the MBMS service, the preferred frequency information indicating the PL of the MBMS service, an MBMS offset, and the FLC_DI setting. The MBMS offset is a threshold to be compared with the signal strength measurement of the PL when a UE on the NPL reselects to the PL. The FLC_DI setting represents FLC applicability for a connected mode UE.

In step 431, a connected mode UE on the NPL 408 operates according to the FLC_DI set in the FLC Notification message. If the FLC_DI setting is 'N', the connected mode UE reselects to the PL 409 based on the measured PL 409. If the FLC_DI setting is 'Y', the connected mode UE selects one of an on-going traffic service at the current frequency and the MBMS service indicated by the FLC Notification message according to their priority levels. If the MBMS service is selected, the connected mode UE discontinues the dedicated traffic service and reselects to the PL according to the measurement of the PL 409. On the other hand, if the dedicated traffic service is selected, the connected mode UE continues the dedicated traffic service at the current frequency without cell reselection.

In the meantime, upon receipt of the FLC Notification message, an idle mode UE on the NPL 408 switches to the PL 409 irrespective of FLC_DI if the signal strength measurement of the PL 409 is sufficient.

Before the MBMS session starts, the RNC 410 counts the number of UEs to receive the MBMS service, decides on a channel type, and sets up a radio bearer between steps 431 and 441.

As the MBMS session starts in step 441, the RNC 410 periodically transmits the FLC Notification message for the MBMS session in order to support the mobility of UEs in cells under the control of the RNC 410 in steps 451 and 452. Upon receipt of the periodic FLC Notification message, the UEs on the NPL 408 perform cell reselection to the PL 409 based on the service ID, preferred frequency information, and the FLC_DI setting in the FLC Notification message, when needed. Thus, they can now receive the MBMS service.

When set as a one-bit flag, the FLC_DI setting indicates FLC application to or FLC restriction from a connected mode UE in the above embodiment, the one-bit flag can be replaced with a one-bit flag indicating applicability for UEs in a specific RRC state, or a 4-bit bitmap or a 2-bit integer indicating FLC applicability for UEs in respective connected mode states.

In this way, the connected mode UE can perform the FLC efficiently with the knowledge of the PL resource availability of an interested MBMS service from the FLC_DI setting.

Figure 7:
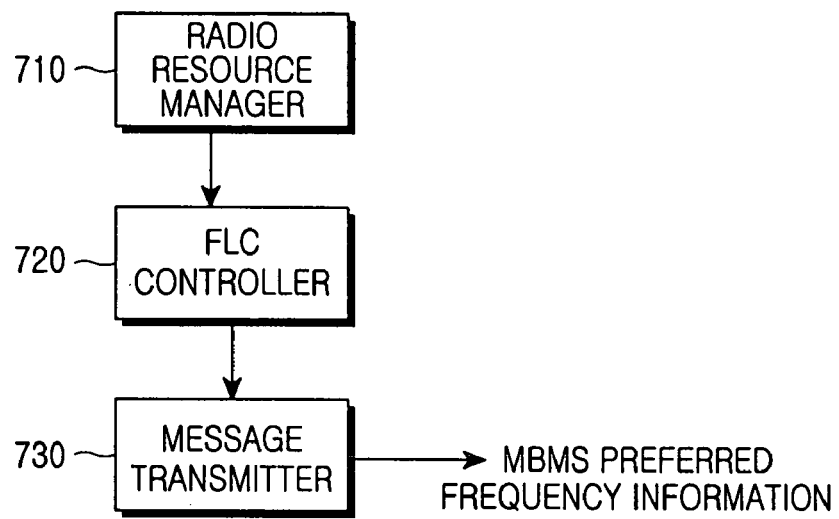
FIG. 7 is a block diagram of an RNC for transmitting MBMS preferred frequency information according to an embodiment of the present invention.

FIG. 7 is a block diagram of an RNC for transmitting MBMS preferred frequency information according to an embodiment of the present invention. The RNC comprises a radio resource manager 710, an FLC controller 720, and a message transmitter 730. A broadcasting transmitter for transmitting the MBMS broadcasting data is not shown herein.

Referring to FIG. 7, the radio resource manager 710 manages the radio resources for cells under its control and measures the amount of radio resources available for each frequency in the cells. The FLC controller 720 determines whether the measured radio resources of the PL of a specific MBMS service are sufficient to accommodate the traffic associated with the on-going dedicated traffic services for the connected mode UEs. The dedicated traffic services are non-MBMS services. To be more specific, the FLC controller 720 determines whether the measured radio resources can accommodate the associated traffic of the connected mode UEs, taking into account the number of connected mode UEs that have joined the MBMS service on a NPL, or the number of connected mode UEs in a particular state. The FLC controller 720 sets the MBMS preferred frequency information according to the determination result. That is, the FLC controller 720 determines the PL of the MBMS service for which a session will start, and at the same time, determines whether to include PL service restriction information in the MBMS preferred frequency information. The MBMS preferred frequency information does not include the PL service restriction information if the radio resources are sufficient to accommodate the associated traffic of the connected mode UEs, and does otherwise. The PL restriction information is when the FLC_DI is set to 'Y', for example. In another embodiment of the present invention, the FLC controller 720 may make a decision to include the PL service restriction information in the MBMS preferred frequency information according to a different criteria such as a policy about MBMS services or selection of a service provider. The message transmitter 730 transmits the MBMS preferred frequency information by a message containing general information associated with the available MBMS services, like the FLC Notification message.

In the case where the MBMS preferred frequency information includes the PL service restriction information, the broadcasting transmitter preferably does not provide any non-MBMS services on the PLs of the MBMS services. On the contrary, in the absence of the PL service restriction information, the broadcasting transmitter can provide non-MBMS services on the MBMS PLs.

Figure 8:
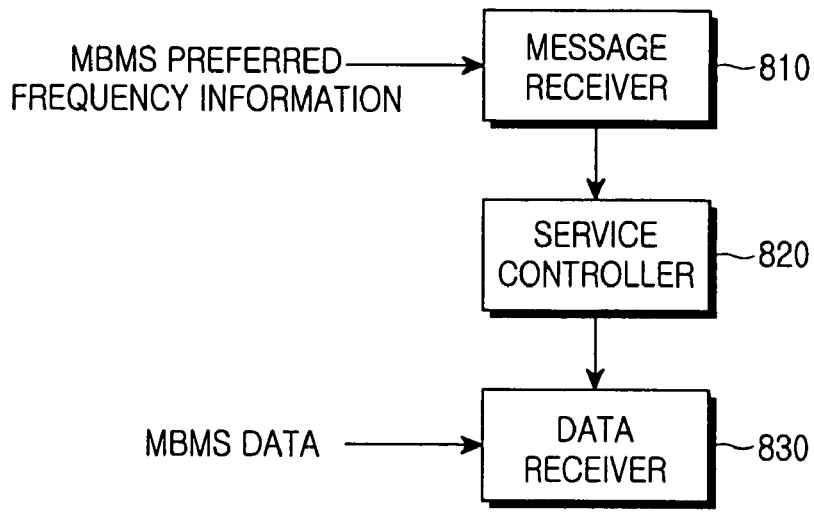
FIG. 8 is a block diagram of a UE which is allowed to use a PL for an MBMS service according to an embodiment of the present invention.

FIG. 8 is a block diagram of a UE which is allowed to use a PL for an MBMS service according to an embodiment of the present invention. The UE comprises a message receiver 810, a service controller 820, and a data receiver 830.

Referring to FIG. 8, the message receiver 810 receives a message including general information about an MBMS service that the UE has joined, and acquires preferred frequency information indicating the PL of the MBMS service. The service controller 820 carries out the procedure illustrated in FIG. 4 or FIG. 5. That is, if the UE is on the PL, the service controller 820 decides to keep the current frequency without performing the MBMS frequency selection procedure. In this case, the data receiver 830 continues receiving a dedicated traffic service at the current frequency.

On the other hand, if the UE is on an NPL and the MBMS preferred frequency information does not include any PL service restriction information, the service controller 820 decides to reselect to the PL of the MBMS service. The data receiver 830 then measures the signal strength of the PL, and if the signal strength exceeds a predetermined threshold, it switches to the PL and continues receiving the dedicated traffic service.

Meanwhile, if the UE is on the NPL and the MBMS preferred frequency information includes the PL service restriction information, the service controller 820 performs the priority-based service selection procedure between the MBMS service and the on-going dedicated traffic service at the current frequency. If the MBMS service is selected, the data receiver 830 discontinues the dedicated traffic service, reselects to the PL of the MBMS service, and receives the broadcasting data of the MBMS data under the control of the service controller 820.

As described above, the embodiments of the present invention notify a connected mode UE of the radio resource state of the PL of an interested MBMS service, thereby avoiding the situation where traffic of the MBMS service is not accommodated on the MBMS PL.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of selecting a frequency layer in a connected mode user equipment (UE) on a non-preferred frequency layer (NPL) in a multimedia broadcast/multicast service (MBMS) mobile communication system, comprising the steps of:
   receiving from a radio network controller (RNC) a message including preferred frequency information associated with a preferred frequency layer (PL) of an MBMS service; and
   performing a frequency selection procedure selectively according to whether or not the preferred frequency information includes PL service restriction information,
   wherein the frequency selection procedure is performed for the PL of the MBMS service if the PL service restriction information is not included in the message
   wherein the preferred frequency information comprises the PL service restriction information, if radio resources of the PL are not sufficient to accommodate traffic of UEs that want to receive the MBMS service in a connected mode or a predetermined radio resource control (RRC) state.

2. The method of claim 1, further comprising the step of keeping the current frequency if the connected mode UE is not on any NPL.

3. The method of claim 1, wherein the PL service restriction information is represented by a bitmap or an integer indicating frequency layer convergence (FLC) applicability for each connected mode state.

4. The method of claim 1, further comprising the step of switching to the PL, if the preferred frequency information does not include the PL service restriction information.

5. The method of claim 1, further comprising the step of continuing to use a current frequency if the preferred frequency information includes the PL service restriction information.

6. A method of selecting a frequency layer in a connected mode user equipment (UE) on a non-preferred frequency layer (NPL) in a multimedia broadcast/multicast service (MBMS) mobile communication system, comprising the steps of:
   receiving from a radio network controller (RNC) a message including preferred frequency information associated with a preferred frequency layer (PL) of an MBMS service;
   performing a frequency selection procedure selectively according to whether or not the preferred frequency information includes PL service restriction information;
   performing a priority-based service selection procedure if the preferred frequency information includes the PL service restriction information; and
   determining whether the connected mode UE continues to use a current frequency according to the result of the priority-based service selection procedure,
   wherein the frequency selection procedure is performed for the PL of the MBMS service if the PL service restriction information is not included in the message.

7. The method of claim 6, further comprising the step of continuing to use the current frequency upon selection of a dedicated traffic service on-going at the current frequency.

8. The method of claim 6, further comprising the step of:
   discontinuing the dedicated traffic service and switching to the PL upon selection of the MBMS service.

9. An apparatus in an user equipment (UE) for selecting a frequency layer in a connected mode in a multimedia broadcast/multicast service (MBMS) mobile communication system, comprising:
   a message receiver for receiving from a radio network controller (RNC) a message including preferred frequency information associated with a preferred frequency layer (PL) of an MBMS service;
   a service controller for determining whether the connected mode UE is on a non-preferred frequency layer (NPL) and whether the preferred frequency information includes PL service restriction information; and
   a data receiver for performing a frequency selection procedure selectively according to whether or not the preferred frequency information includes the PL service restriction information, wherein the frequency selection procedure is performed for the PL of the MBMS service if the PL service restriction information is not included in the message wherein the preferred frequency information comprises the PL service restriction information, if radio resources of the PL are not sufficient to accommodate traffic of UEs that want to receive the MBMS service in a connected mode or a predetermined radio resource control (RRC) state.

10. The apparatus of claim 9, wherein the data receiver keeps the current frequency if the connected mode UE is not on any NPL.

11. The apparatus of claim 9, wherein the service controller performs a priority-based service selection procedure if the UE is on the NPL and the preferred frequency information includes the PL service restriction information.

12. The apparatus of claim 11, wherein the data receiver continues to use a current frequency upon selection of a dedicated traffic service on-going at the current frequency, and discontinues the dedicated traffic service and switches to the PL upon selection of the MBMS service.

13. The apparatus of claim 9, wherein the PL service restriction information is represented by a bitmap or an integer indicating frequency layer convergence (FLC) applicability for each connected mode state.

14. The apparatus of claim 9, wherein the data receiver switches to the PL and receiving the MBMS service, if the preferred frequency information does not include the PL service restriction information.

15. The apparatus of claim 9, wherein the data receiver continues to use a current frequency if the preferred frequency information includes the PL service restriction information.

16. A method of controlling frequency layer selection of connected mode user equipments (UEs) in a radio network controller (RNC) in a multimedia broadcast/multicast service (MBMS) mobile communication system, comprising the steps of:
   determining preferred frequency information comprising preferred frequency layer (PL) service restriction information which restricts connected mode UEs in cells controlled by the RNC from reselecting to the PLs of MBMS services that the connected mode UEs want; and
   transmitting to the connected mode UEs a message including the preferred frequency information,
   wherein the connected mode UEs perform a frequency selection procedure for the PLs of the MBMS services if the PL service restriction information is not included in the message
   wherein the preferred frequency information includes the PL service restriction information, if radio resources of the PL are not sufficient to accommodate traffic of UEs that want to receive the MBMS service in a connected mode or a predetermined radio resource control (RRC) state.

17. The method of claim 16, wherein the PL service restriction information is represented by a bitmap or an integer indicating frequency layer convergence (FLC) applicability for each connected mode state.

18. An apparatus for controlling frequency layer selection of connected mode user equipments (UEs) in a radio network controller (RNC) in a multimedia broadcast/multicast service (MBMS) mobile communication system, comprising:
   a frequency layer convergence (FLC) controller for determining preferred frequency information comprising preferred frequency layer (PL) service restriction information which restricts connected mode UEs in cells controlled by the RNC from reselecting to the PLs of MBMS services that the connected mode UEs want; and
   a message transmitter for transmitting to the connected mode UEs a message including the preferred frequency information,
   wherein the connected mode UEs perform a frequency selection procedure for the PLs of the MBMS services if the PL service restriction information is not included in the message
   wherein the preferred frequency information includes the PL service restriction information, if radio resources of the PL are not sufficient to accommodate traffic of UEs that want to receive the MBMS service in a connected mode or a predetermined radio resource control (RRC) state.

19. The apparatus of claim 18, wherein the preferred frequency information includes the PL service restriction information, if radio resources of the PL are not sufficient to accommodate traffic of UEs that want to receive the MBMS service in a connected mode or a predetermined radio resource control (RRC) state.

20. The apparatus of claim 18, wherein the PL service restriction information is represented by a bitmap or an integer indicating frequency layer convergence (FLC) applicability for each connected mode state.

21. The apparatus of claim 18, further comprising a radio resource manager for managing radio resources of the cells, measuring the amount of radio resources available for each frequency in the cells, and providing the measurements to the FLC controller for use in determining the preferred frequency information.

* * * * *